M. SCHILDE.
PROCESS OF MANUFACTURING ICE.
APPLICATION FILED FEB. 10, 1915.
1,194,430.
Patented Aug. 15, 1916.
14 SHEETS—SHEET 4.
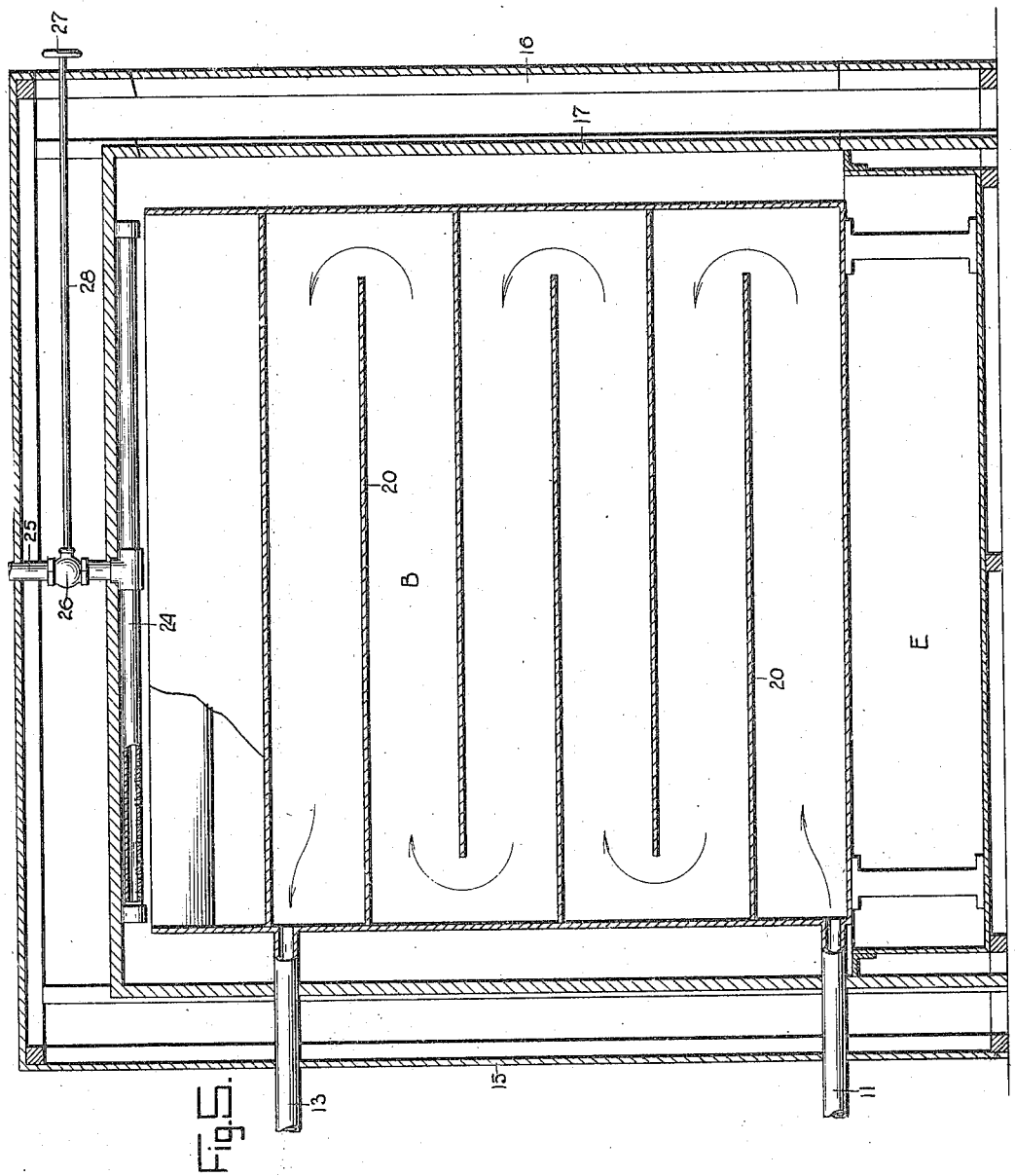
WITNESSES
INVENTOR
Martin Schilde
BY
ATTORNEYS M. SCHILDE.
PROCESS OF MANUFACTURING ICE.
APPLICATION FILED FEB. 10, 1915.
1,194,430.
Patented Aug. 15, 1916.
14 SHEETS—SHEET 5.
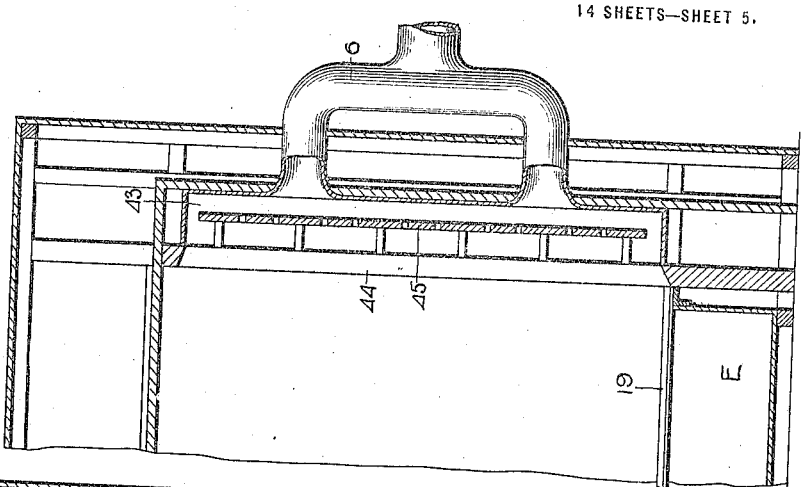
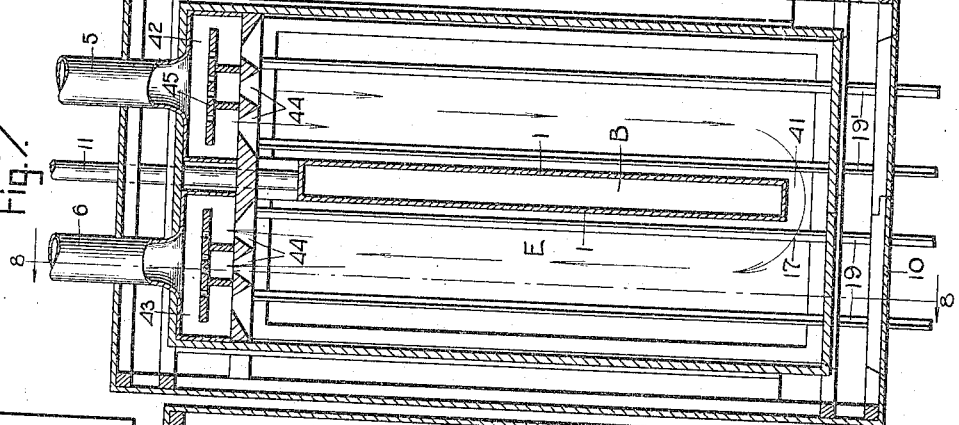
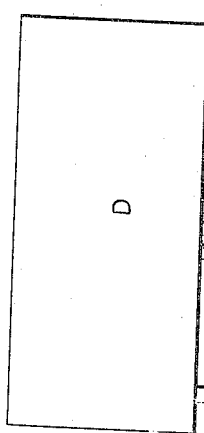
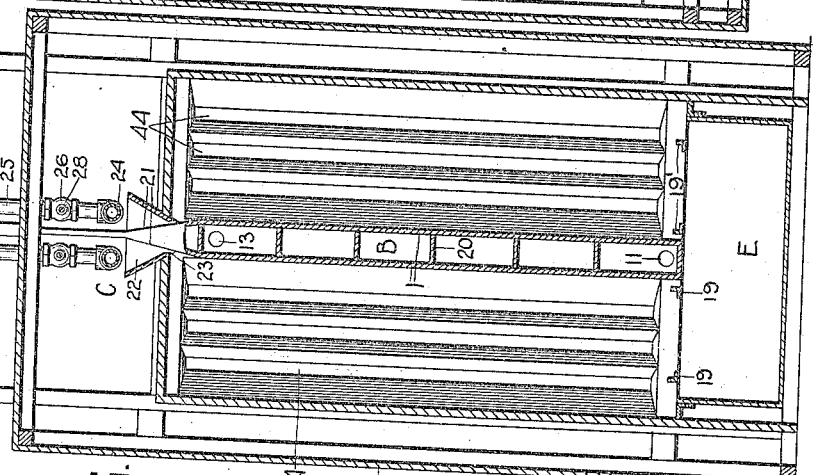
WITNESSES
INVENTOR
Martin Schilde
BY
ATTORNEYS M. SCHILDE.
PROCESS OF MANUFACTURING ICE.
APPLICATION FILED FEB. 10, 1915.
1,194,430.
Patented Aug. 15, 1916.
14 SHEETS—SHEET 6.
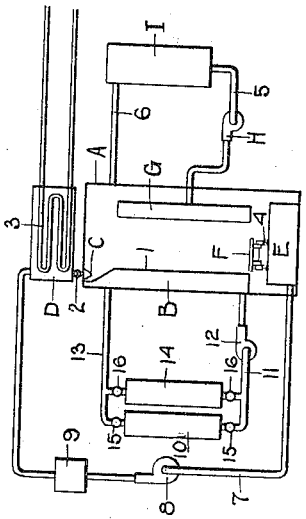
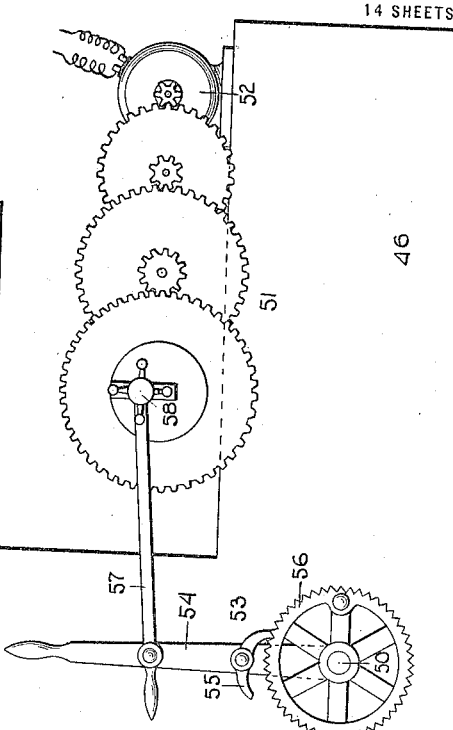
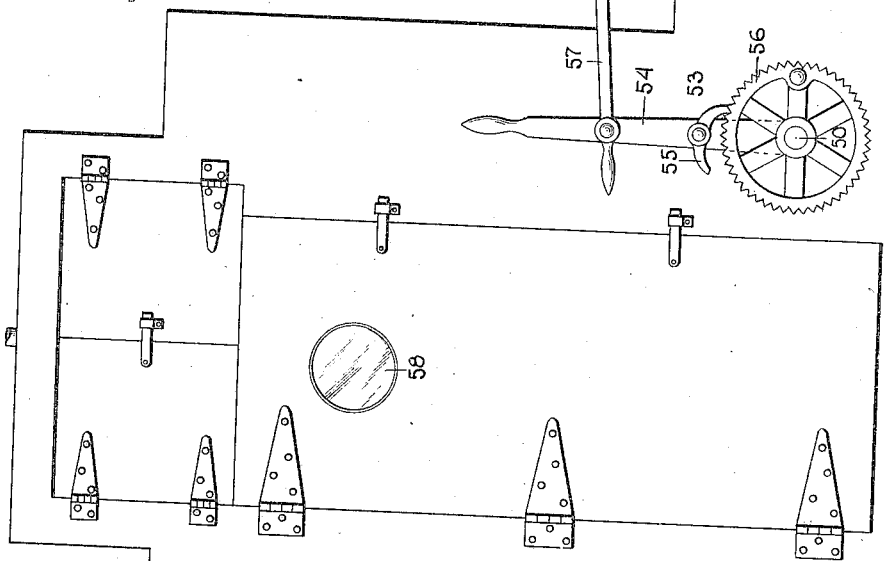
WITNESSES
INVENTOR
Martin Schilde
BY
ATTORNEYS

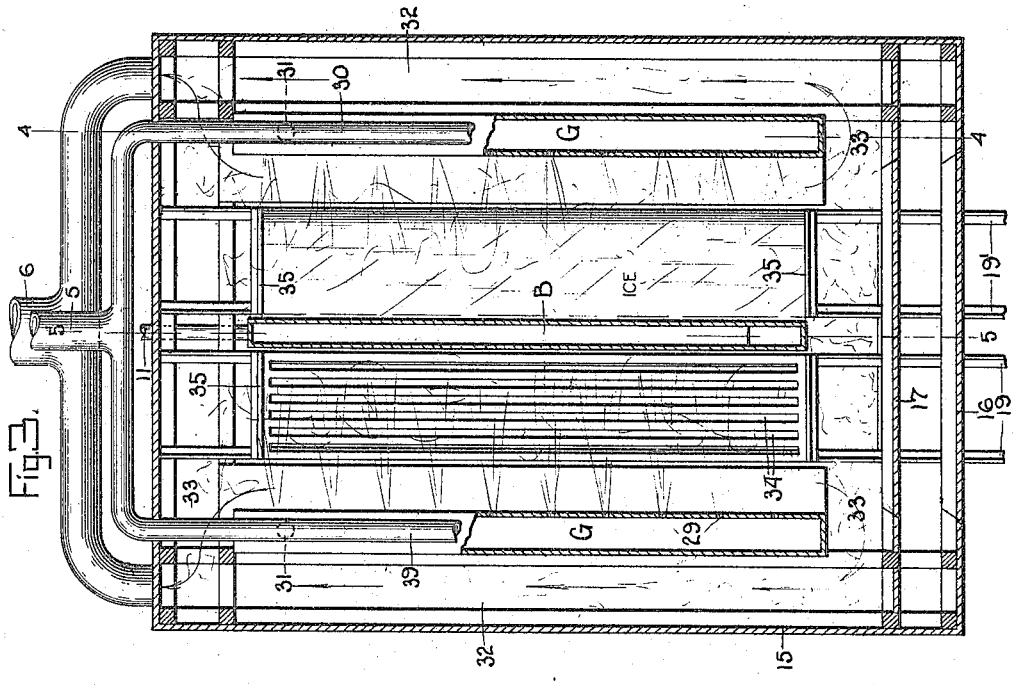

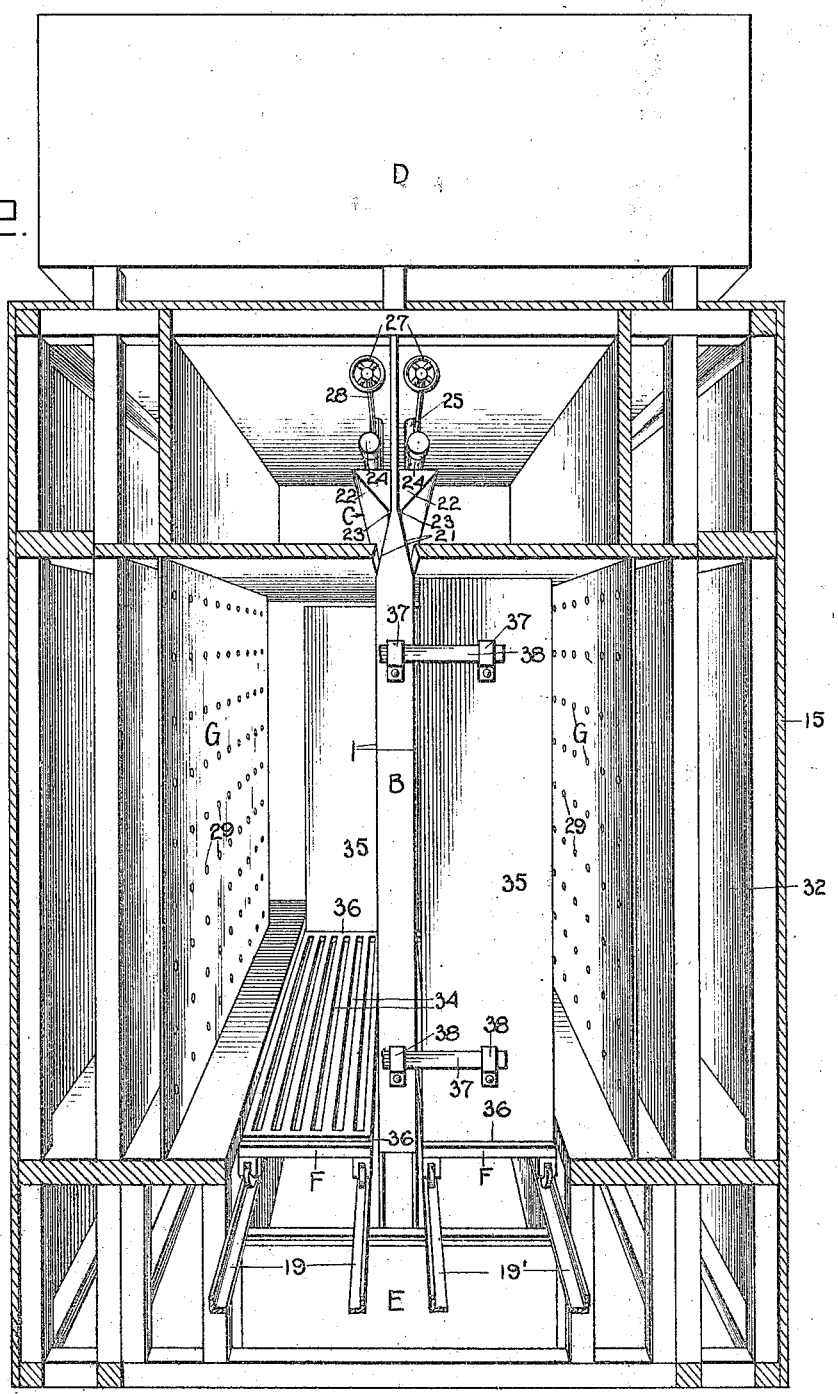

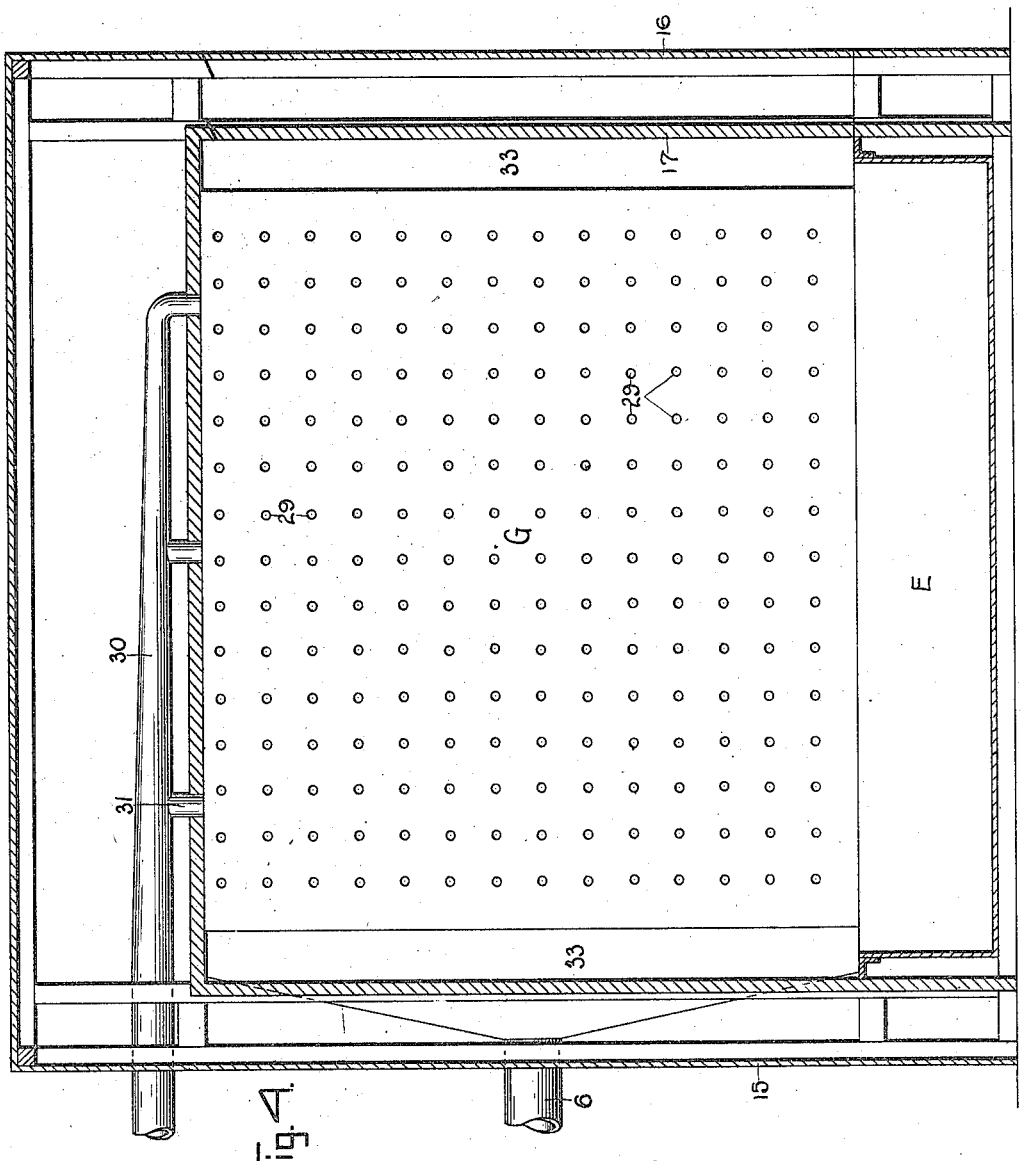

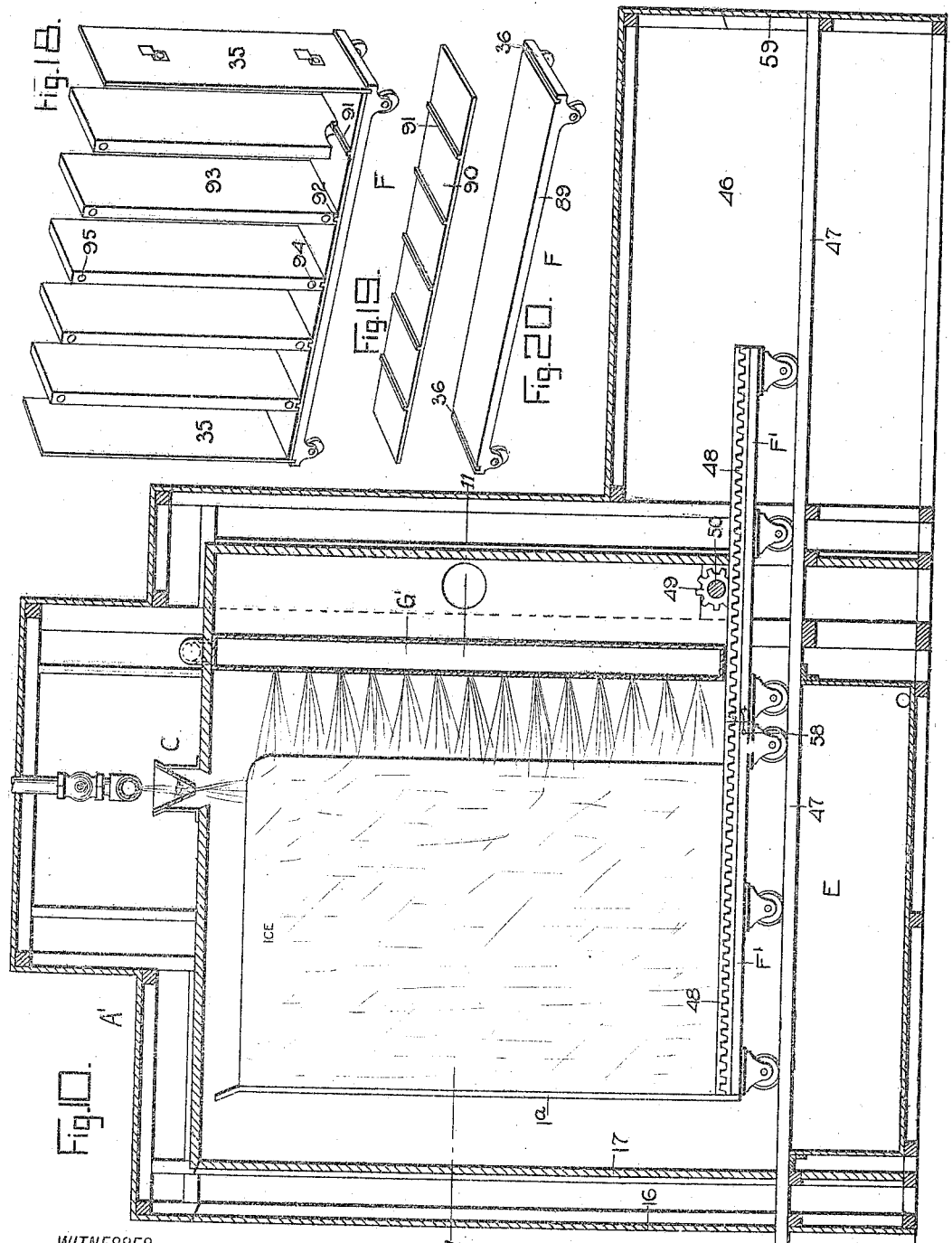

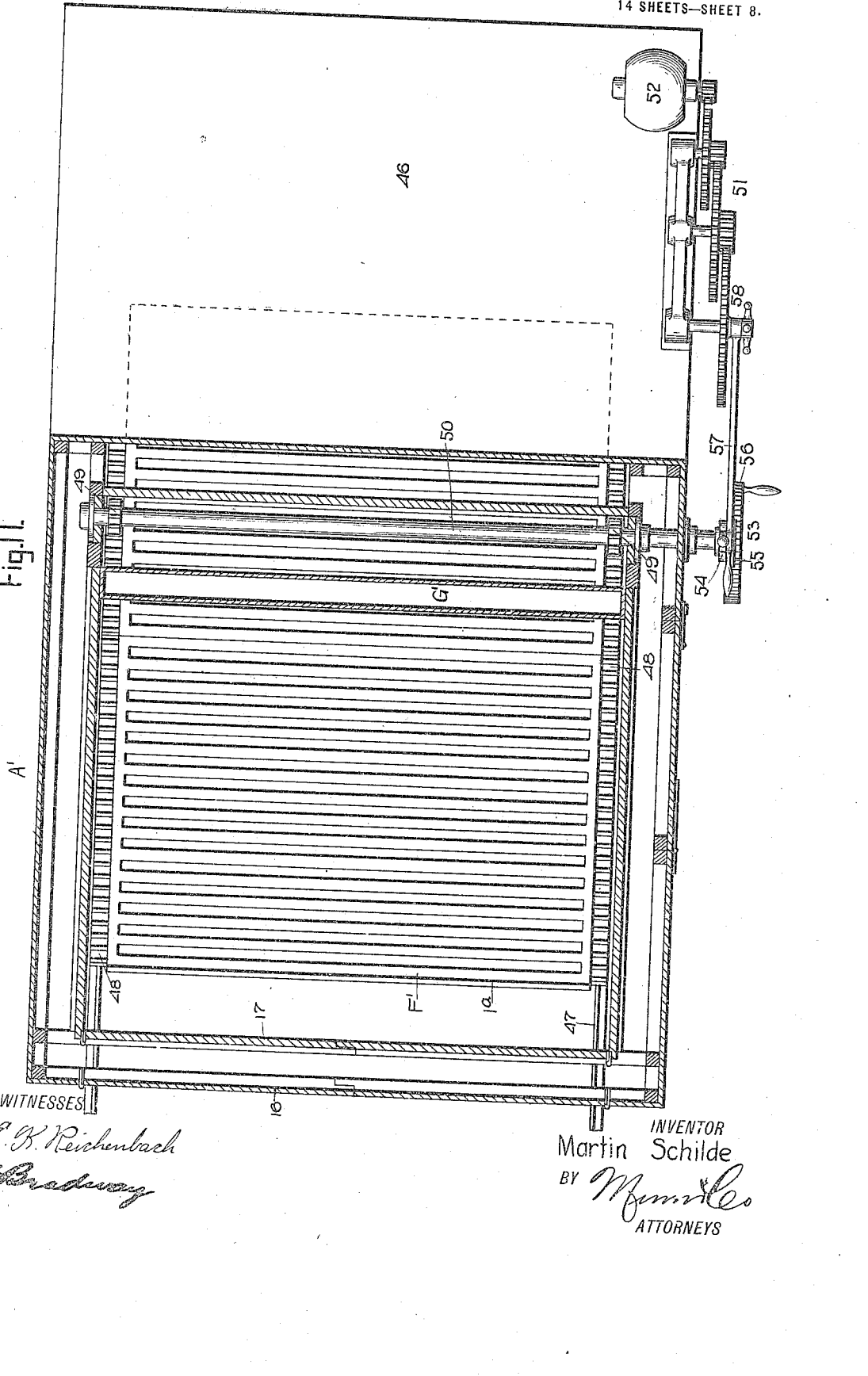

M. SCHILDE.
PROCESS OF MANUFACTURING ICE.
APPLICATION FILED FEB. 10, 1915.
1,194,430.
Patented Aug. 15, 1916.
14 SHEETS—SHEET 9.
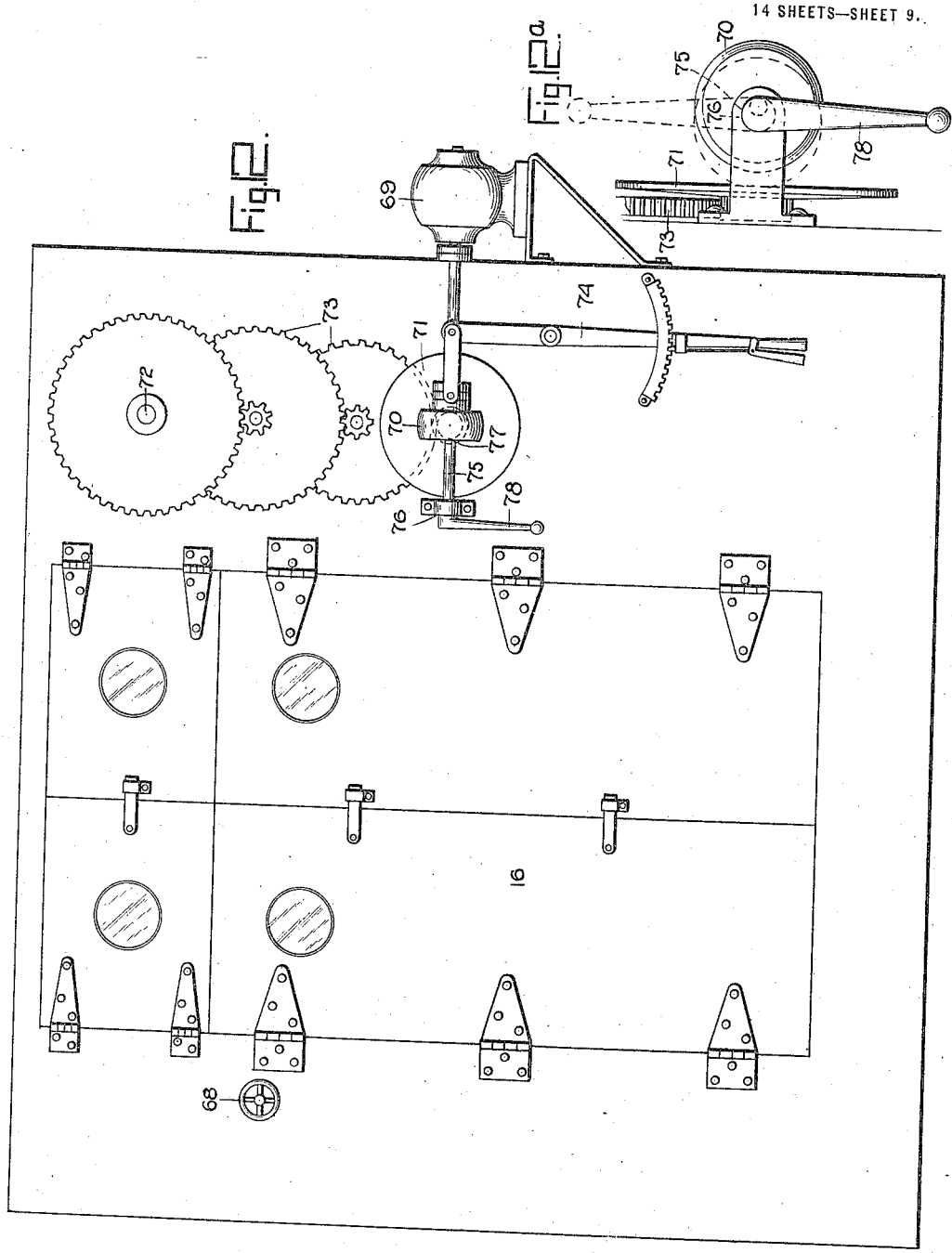
WITNESSES
E. K. Reichenbach.
C. Bradway.
INVENTOR
Martin Schilde
BY Munn & Co.
ATTORNEYS M. SCHILDE.
PROCESS OF MANUFACTURING ICE.
APPLICATION FILED FEB. 10, 1915.
1,194,430.
Patented Aug. 15, 1916.
14 SHEETS—SHEET 10.
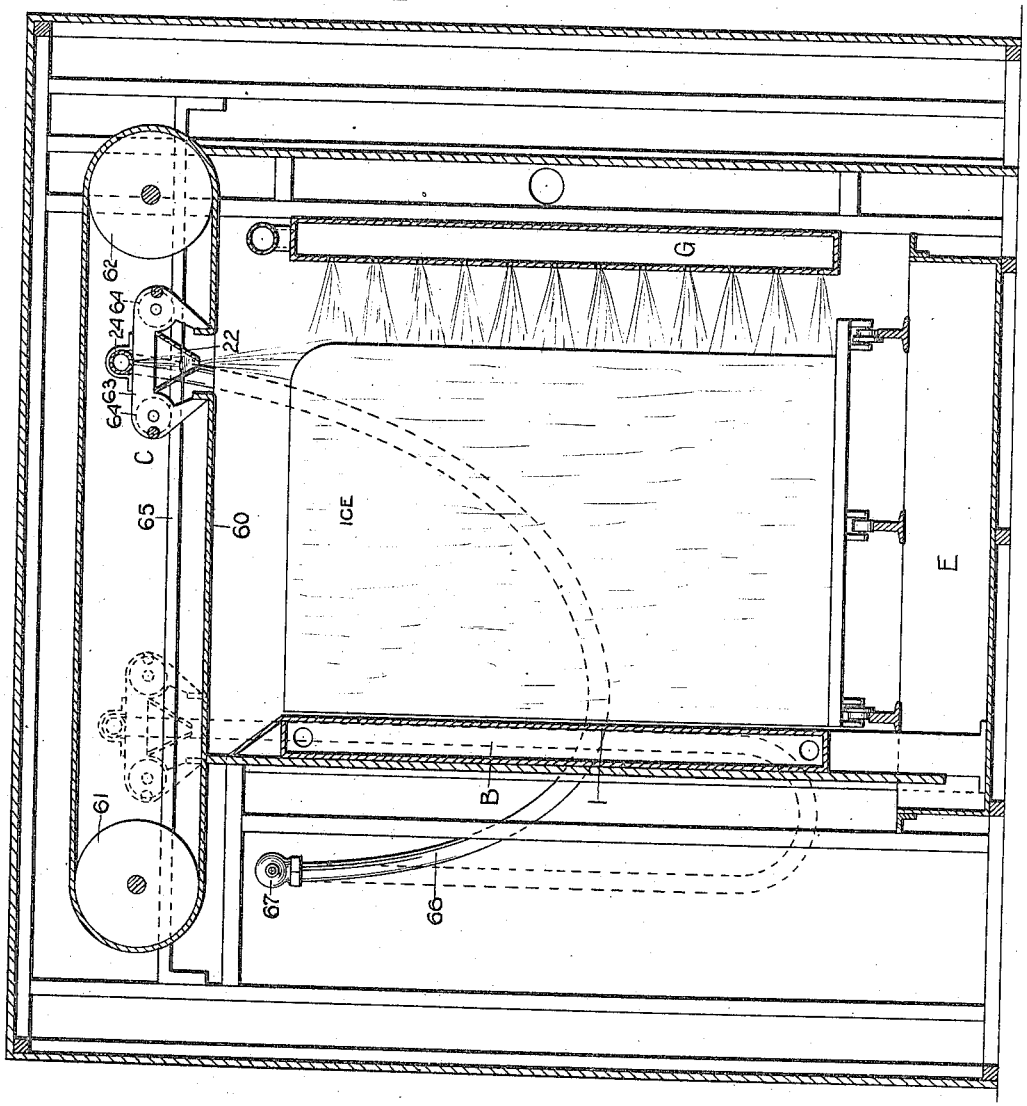
WITNESSES
INVENTOR
Martin Schilde
BY
ATTORNEYS

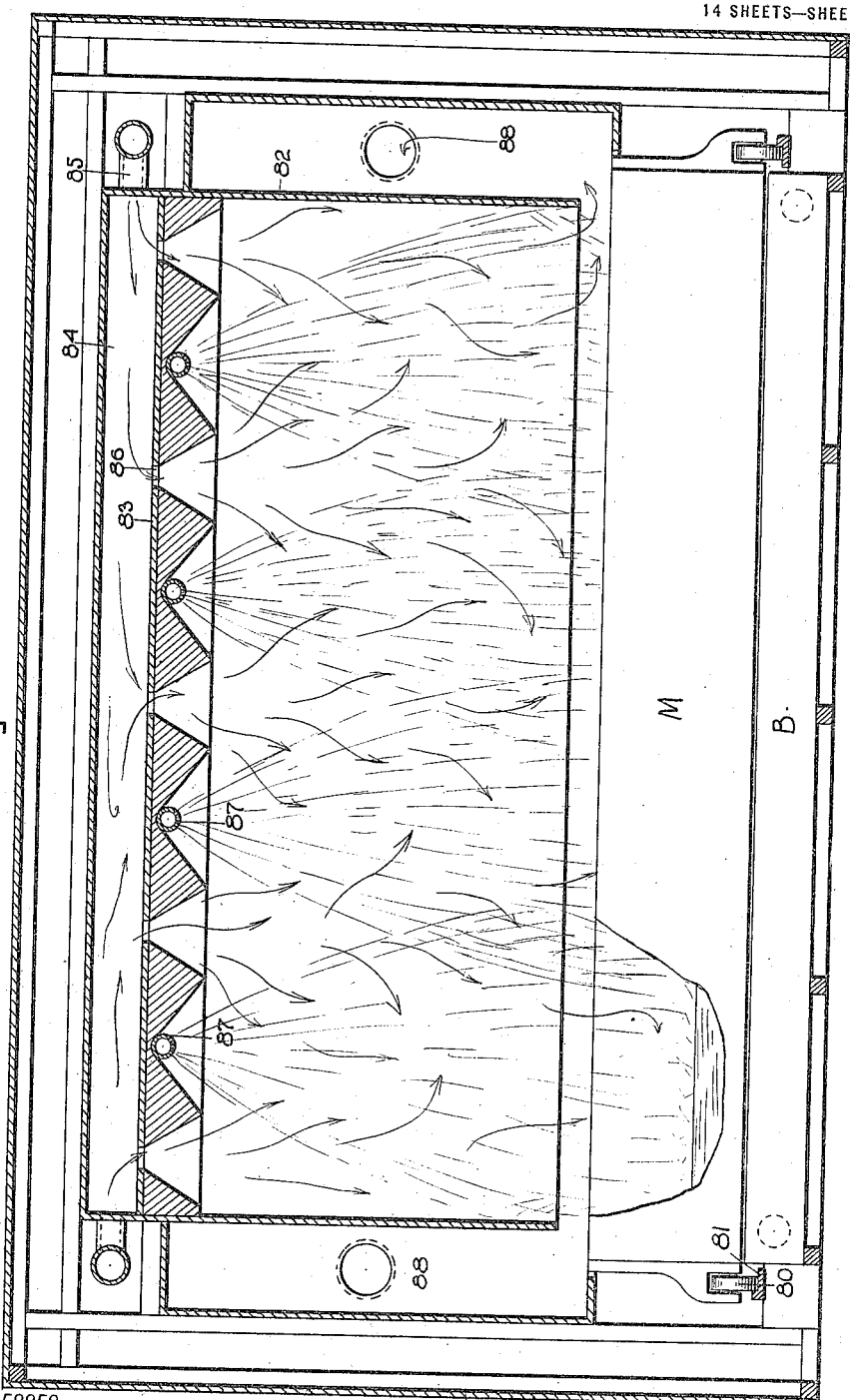

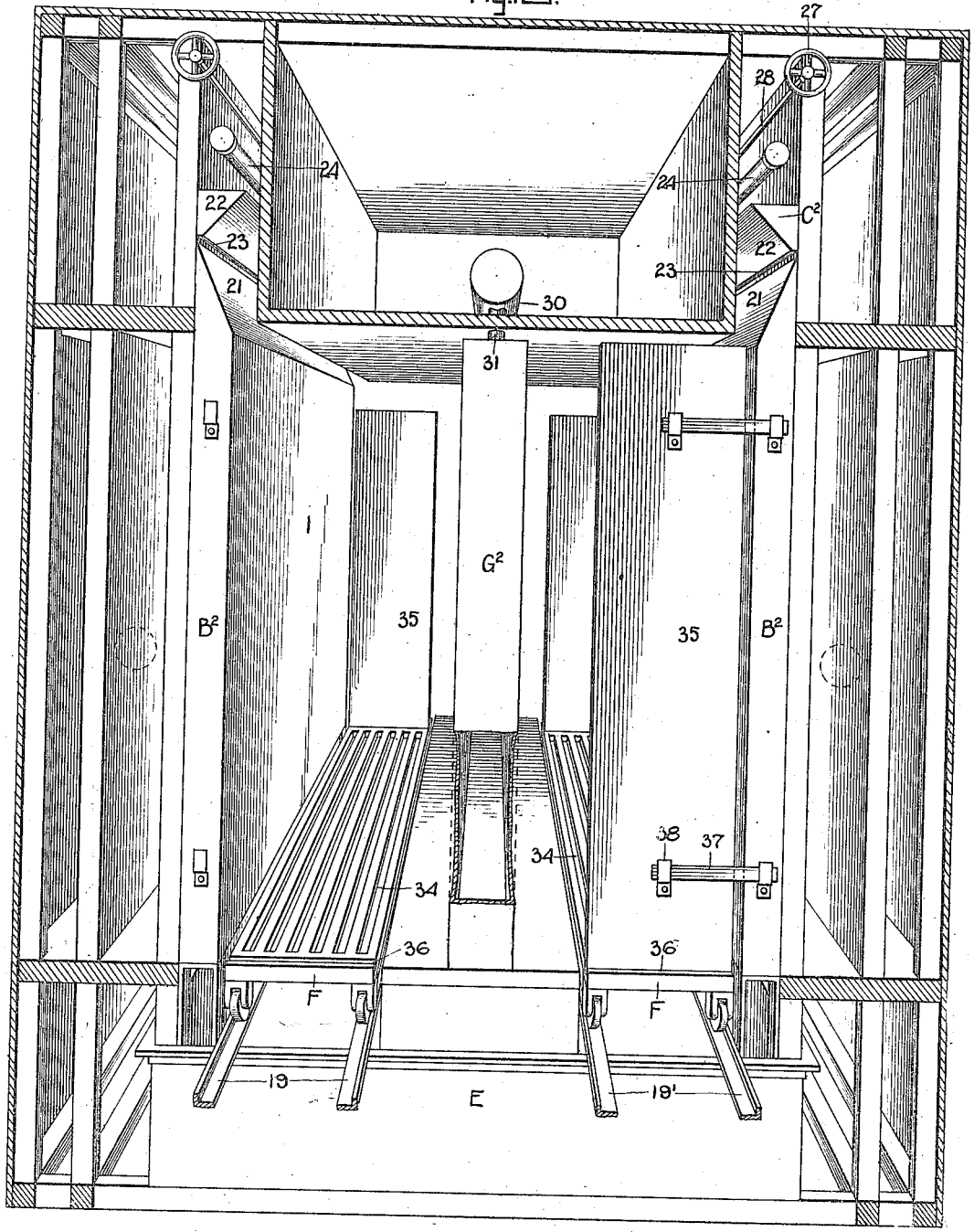

M. SCHILDE.
PROCESS OF MANUFACTURING ICE.
APPLICATION FILED FEB. 10, 1915.
1,194,430.
Patented Aug. 15, 1916
14 SHEETS—SHEET 13.
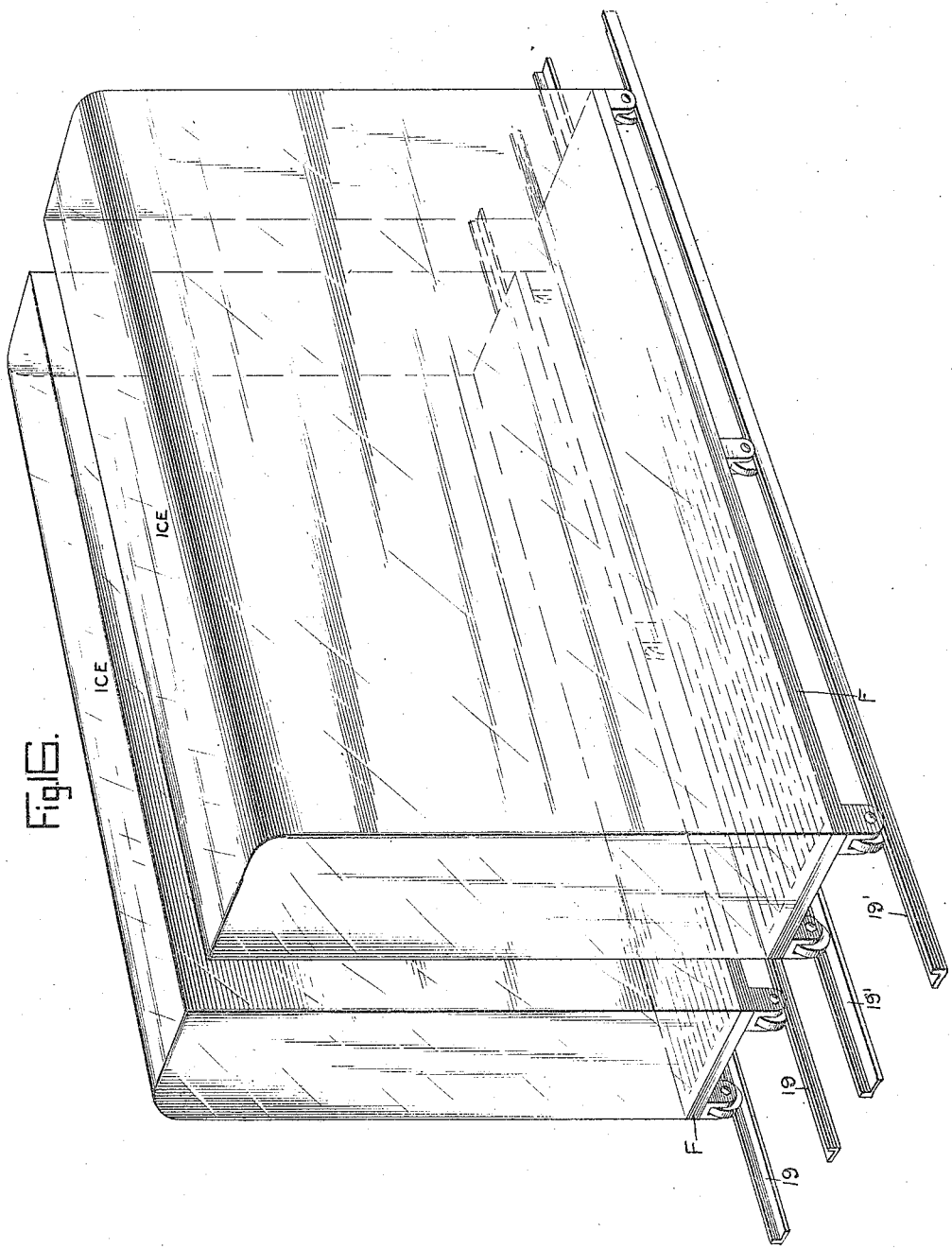
WITNESSES
E. K. Reichenbach
B. Chadwing
INVENTOR
Martin Schilde
BY Munn & Co
ATTORNEYS

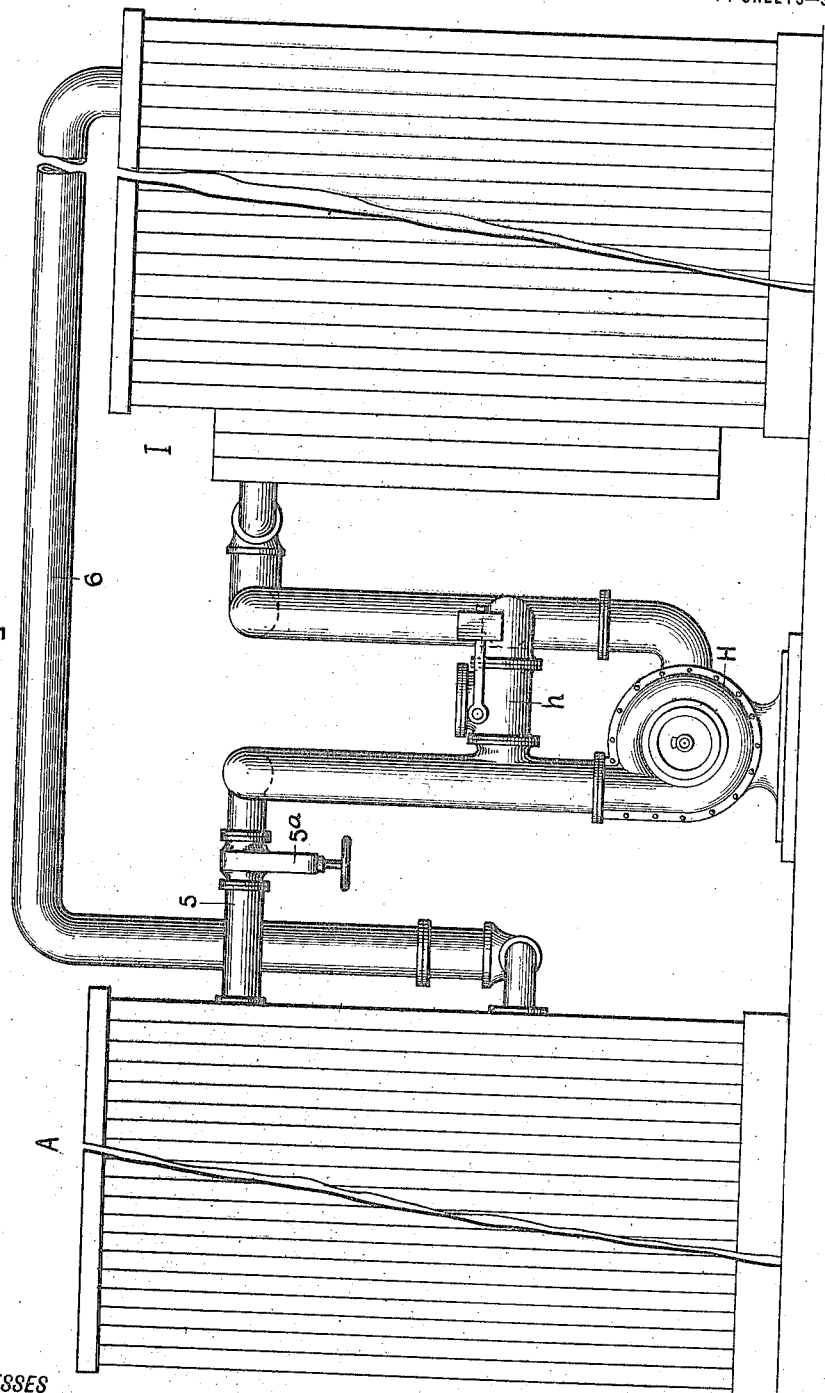

UNITED STATES PATENT OFFICE.

MARTIN SCHILDE, OF NEW ORLEANS, LOUISIANA.

PROCESS OF MANUFACTURING ICE.

1,194,430. Specification of Letters Patent. Patented Aug. 15, 1916.

Application filed February 10, 1915. Serial No. 7,288.

*To all whom it may concern:*

Be it known that I, MARTIN SCHILDE, a citizen of the United States, and a resident of New Orleans, in the parish of Orleans and State of Louisiana, have invented a new and Improved Process of Manufacturing Ice, of which the following is a full, clear, and exact description.

This invention relates to a process of making absolutely clear, hard, pure and coreless ice in block or plate form from raw water, and as compared with other systems it has the advantage that there is a great saving in the installation and operating costs, comparatively very little space required for a given output of ice, the time for freezing blocks or plate materially reduced, and the construction and operation greatly simplified.

In the present systems of ice making with some exceptions the freezing of the water takes place through the ice as it is progressively formed. For instance, in the can system the freezing brine in which the water-filled cans are placed acts directly on the outer regions of the water in contact with the walls of the cans and quickly freezes the water in these regions, and after the first film of ice is formed the abstraction of heat from the water by the freezing brine takes place through the film of ice, and as this film becomes thicker and thicker the rate of freezing of the water is progressively diminished, so that when there is a considerable body of ice formed, the freezing of the water at the center of the can takes place very slowly. In the can system it takes from thirty-six to forty hours, and even more, depending on the temperature of the brine, to freeze a standard block of ice eleven inches in thickness. This is accomplished by the ice being built up from all four sides in the can, so that in thirty-six or forty hours there are actually only five and one-half inches of ice formed, five and one-half inches on each side of the can, which gives a block of ice eleven inches thick, where on the other hand, in the plate system, to freeze a standard plate of ice eleven inches thick will take much longer to accomplish, on account of the freezing taking place from one side only. To freeze a standard plate of ice eleven inches in thickness will take six days and six nights to accomplish, and seven days and seven nights to freeze a plate of twelve inches in thickness. The resistant quality of ice as a non-conductor can be best observed or noticed in the present plate system now in use, where the freezing takes place from one side only, through the ice. When beginning to freeze a plate of ice twelve inches in thickness the first inch of ice is formed in about one hour, but when it comes to freeze the twelfth inch it takes twenty-four hours to freeze this last inch, against one hour to freeze the first inch. The reason it takes so long to freeze the twelfth inch of ice, is because at that time the ice is the thickest and offers the most resistance as a non-conductor. The water which is to be formed into the last, or twelfth inch of ice, must have the heat abstracted from it through the eleven inches of ice already formed, which accounts for the slow process of freezing. Not only is this long period of time for freezing ice a great objection to those systems wherein the abstraction of the heat from the water takes place through the body of ice as the freezing progresses, with the accompanying loss by radiation during the long period of freezing, but expensive apparatus is required for the complete plant, such as the water distilling mechanism, the can hoisting apparatus and traveling crane, and the extensive brine tank in which the cans are placed. In the present raw water can and plate systems compressed air is used, expensive machinery is necessary to compress and precool the air which is used in the cans or cells to agitate the water to be frozen, besides the expensive pipe headers required on top of the freezing tank to distribute the air in the different directions and into the cans. There are also several other raw water systems in use where other means are employed to agitate or circulate the water in the cans or the cells in place of compressed air, but they are all complicated and costly, and only prolong the process of freezing.

These objections are effectively overcome by the system herein set forth, due to the novel maner in which the water is converted into ice. The refrigerant employed is air or gas of zero temperature which constitutes an atmosphere into which water is conducted in such a manner that the water is formed into ice. According to one method the water, which is preferably pre-cooled, is supplied in the form of a sheet that initially flows down a surface that may or may not be cooled by brine circulating in contact with the back thereof, and directed toward this surface is a blast of the refrigerant gas which acts on the sheet of water to produce the ice, and as the flow of water and the current of refrigerant are maintained, the ice will progressively build up until the desired thickness is obtained. It will thus be seen that the refrigerant gas at no time acts through a film or body of ice to abstract heat from the water, as is necessary in the can and plate systems, but interposed between the body of ice and the refrigerant is a film of water which in part at least freezes on the already formed ice. The advantage of this is that ice can be built up at the rate of from one-eighth to one-quarter inch per minute, so that a block twelve inches in thickness can be produced in the period of an hour or two as compared with a period of thirty-six to forty hours for making a similar block of ice according to the can method.

In order to produce a superior quality of ice it is preferable to maintain a continuous flow of water in excess of the freezing capacity of the refrigerant, so that only a part of the water will be converted into ice, and as a consequence there will be a continuous flow of water down the forming surface of the ice, so that mechanical impurities in the water will not freeze into the ice, but be washed away. This produces a hard, absolutely clear and pure ice, but if the supply of water were not in excess of the freezing capacity of the refrigerant and all the water should be frozen into ice, the mass of ice would be white, not pure, and soft and spongy.

In carrying out the process a cell of suitable construction is employed into which a carriage on which the ice is to be formed is placed and along one side of this carriage is a vertical wall which may be cooled by the circulation of brine at zero temperature along the back thereof. Spaced from this wall is a perforated header which discharges air at zero temperature toward the wall, so that water in the form of a sheet flowing down the wall and down the ice formed thereon will be frozen progressively into a block or plate. When the freezing is conducted to the desired thickness the supply of refrigerant air is cut off and the circulation of cold brine is substituted by the circulation of warm brine, whereby the block of ice is melted loose from the wall, and after the ice has been allowed to temper for an hour or so by throwing the doors of the cell open, the carriage with the block of ice formed thereon is removed from the cell. When so removed warm water is played upon the carriage so as to loosen the block of ice therefrom. The carriage is then returned to the cell and the process repeated.

As the supply of water is in excess of the freezing capacity of the refrigerant there will be a continual flow of water down the surface of the ice, thereby insuring the production of an absolutely clear and pure ice, and free from all germs and bacteria. This excess water flows through apertures in the car and drains into a tank under the track on which the car moves. This water is filtered and returns to a pre-cooling tank that feeds water to the means that supplies the water in sheet form to the cell. Of course the supply of water is interrupted when the block of ice is finished and during the tempering and removing thereof.

The gaseous refrigerant circulates in a closed system which comprises a cooling chamber that is connected by a blower or fan with the perforated header in the freezing cell, and the freezing compartment of the cell is connected by a return pipe with the cooling chamber, so that there is a constant supply of refrigerant at the desired temperature acting on the continuously supplied water which is formed into ice in the cell. The refrigerant gas acting at any moment in the cell abstracts heat from the water and then the gas is returned to the cooling chamber to be reduced again to the desired temperature before being returned to the cell, and thus the gas is used over and over.

With this method of operation blocks or plates of ice of any desired thickness may be obtained by supplying the sheet of water from a point alining with the side of the mass of ice on which the building up process takes place, and this result can be obtained by having the carriage and the water supply means relatively movable at a rate uniform with the rate of ice production. Either the carriage can move at its required rate while the supply means is stationary, or the carriage can be held stationary while the water supply means is movable.

According to another method involving the basic ideas of the present invention the water can be supplied in the form of a spray into the refrigerant atmosphere and the particles of water will form into a mass of ice within a mold, the bottom of which comprises a brine chamber which coacts with the refrigerant atmosphere for producing the ice mass. When the mold is filled the freezing brine is removed from the brine chamber and warm brine substituted, so as to melt the ice mass from the chamber, and thereupon the mold with the ice therein can be removed from the cell. By warming the walls of the mold the block of ice can be readily removed. In this case the water spraying into the cell will preferably be distilled or spring water, except where the ice is to be used for refrigerating purposes, when raw water may be employed. With this new process ice can be frozen to an unlimited thickness, not influencing the speed of freezing in the least.

For a more complete understanding of the invention reference is to be had to the accompanying drawings which illustrate certain embodiments of the invention, and wherein similar characters of reference indicate corresponding parts in all the views, in which—

Figure 1 is a front view of a double compartment cell for making two plates or blocks of ice in one operation; Fig. 2 is an internal perspective view of the cell; Fig. 3 is a horizontal sectional view thereof; Fig. 4 is a sectional view on the line 4—4, Fig. 3, showing one of the air headers; Fig. 5 is a central vertical section on the line 5—5, Fig. 3, through the brine chamber; Fig. 6 is a transverse vertical section of a modified form of cell; Fig. 7 is a horizontal section of the cell shown in Fig. 6; Fig. 8 is a fragmentary vertical section on the line 8—8, Fig. 7; Fig. 9 is a side view of a further form of cell in which the carrier is progressively moved as the block of ice is formed; Fig. 10 is a longitudinal vertical section of the cell shown in Fig. 9; Fig. 11 is a horizontal section on the line 11—11, Fig. 10; Fig. 12 is a front view of a cell in which the water feeding means moves progressively as the block of ice builds up in the cell; Fig. 12ª is a detail view of driving mechanism for the water feeding means. Fig. 13 is a vertical section of the cell shown in Fig. 12; Fig. 14 is a vertical section of another modified form of cell in which the water is sprayed into the freezing atmosphere or refrigerant; Fig. 15 is an internal perspective view of a cell for making two blocks or plates of ice, the air header or distributer being located in the center of the cell; Fig. 16 is a perspective view of two finished plates of ice as they come from the cell shown in Fig. 2; Fig. 17 is a side view of the cell, the refrigerant air cooler and the circulating means connecting the two; Fig. 18 is a perspective view of one of the carriages on which a plurality of blocks of ice are formed at the same time; Fig. 19 is a perspective view of the plate of the carriage that holds the partition plates on the body of the carriage; Fig. 20 is a perspective view of the carriage body; and Fig. 21 is a diagrammatic view of the ice making system.

Referring to Fig. 21 of the drawings a general idea of the system will be obtained. In this figure A designates a cell which has suitably arranged therein a brine chamber B provided with a vertical surface 1 on which ice is adapted to form, and above this chamber is a water supply means C that has a valve 2 for controlling the amount of water flowing to the supply means C from a tank D that contains an ammonia coil or other pre-cooler 3. In the bottom of the cell A is a drainage tank E over which are track rails 4 for receiving a carriage F, one edge of which is adjacent the surface 1, so that as water flows down the surface 1 and the ice forms thereon a block of ice will be built up on the carriage F, this water being frozen by air or gas at zero temperature that discharges against the water from a perforated header G which is located within the cell A. This header G is connected with a suitable cooler I by means of a supply pipe 5 that includes a suitable pump H. The air or gas refrigerant after acting on the water to abstract heat therefrom, converting the water into ice, returns to the cooler I through a return pipe 6. An excessive amount of water is supplied so that the outer surface of the block of ice will be continually washed and this excess water is collected in the tank E. From this tank the water is returned to the pre-cooling tank D through a pipe connection 7 that includes a pump 8 and a filter 9. The brine is supplied to the chamber B from a tank 10 that is connected by a pipe 11 with the bottom of the chamber B, there being in the pipe 11 a circulating pump 12, and the upper end of the chamber B is connected by a pipe 13 with the tank 10. This tank 10 cools the brine to about zero temperature, and the brine is kept circulating throughout the process of making a block or plate of ice. After the plate is formed it is melted from the surface 1 by circulating warm brine through the chamber B from the warm brine tank 14, the tanks 10 and 11 having valves 15 and 16 respectively, whereby either tank can be connected with the pump and brine chamber B.

The method of operation briefly consists of circulating brine through the chamber B to cool the surface 1 to the desired temperature. A sheet of water is now permitted to flow down the surface 1 from the top thereof, and by reason of the low temperature of this surface part of the water turns into ice. The water continues to flow from the device C and at the same time the gaseous refrigerant is supplied by the header G and causes the water flowing down the surface of the ice formed on the surface 1 to be partly converted into ice. In this manner the plate or block of ice is built up progressively on the surface 1 and car F, and during this process the water which is collected in the tank E is filtered and returned to the overhead tank D. When the block or plate of ice is completed the pumps H and 8 are stopped and the cold brine tank 10 is cut out of circuit and the warm brine tank 14 is cut into circuit, so that warm brine will circulate through the chamber B in the cell A to melt loose the mass of ice, whereby the car F and the ice thereon can be removed from the cell, but before removing the ice from the cell the doors thereof are thrown open and the ice remains in the open cell for about an hour so as to properly temper the ice. The block of ice can be removed from the carriage F in any suitable way, as by warm water being directed from underneath against the carriage to warm the same and thereby melt the ice loose. The carriage is then returned to the cell and the doors closed so that another plate or block of ice can be made in the manner above described.

The cells may be constructed in a variety of ways and of any desirable size. One form of cell is shown in Figs. 1 to 5 inclusive. This cell comprises a casing 15 of any desired construction and at the front it is provided with outer and inner sets of doors 16 and 17 respectively, permitting access to the interior. This type of cell is adapted to produce two plates or blocks of ice in one operation, and into the opening 18 of the front extend two sets of track rails 19 and 19' for cars or carriages F to run thereon into and out of the cell when the doors are opened. Arranged longitudinally of the cell and at the center thereof is the freezing brine chamber B having oppositely disposed surfaces 1 on which the ice is formed, and the carriages F are in close proximity to these surfaces, so that the ice will be built up on the carriages at the same time it is built up on the surfaces 1. This brine chamber B is internally constructed as shown in Fig. 5, wherein alternately arranged horizontal partitions 20 divide the interior of the chamber into a serpentine passage which has the inlet pipe 11 connected at the bottom and the outlet pipe 13 connected at the top. Above the top of the chamber B are inclined surfaces or sheds 21 down which sheets of water flow to the ice-forming surfaces 1, these sheets of water being produced by the devices C which comprise troughs 22 having narrow slits or discharge openings 23 as long as the surfaces 1, and into these troughs water is supplied by perforated pipes or headers 24 which are connected by risers 25 with the overhead pre-cooling tank D, the risers 25 having valves 26 which can be controlled by means of handwheels 27 fastened to the front ends of the valve stems 28. These valves are so adjusted that the water will flow in sheet form quantitatively in excess of the freezing capacity of the refrigerant within the cell. The freezing brine chamber B divides the interior of the cell into two compartments in which the respective blocks of ice are formed, and the outer walls of the compartments are formed by perforated headers G which are substantially as large as the surfaces 1, and through the perforations 29 of these headers air or other gas at zero temperature is discharged against the water flowing down the surfaces 1 or the ice formed thereon. These headers G are rectangular casings and they are connected at the top with inlet manifolds 30, each of which has a plurality of connections 31 with the perforated headers, so that there will be a better distribution of air in the headers and a more uniform discharge through the various apertures 29, and these manifolds 30 are connected externally of the cell with the pipe 5 that connects, as shown in Figs. 17 and 21, with the air cooler I. Behind or to the sides of the air headers G are outlet passages or chambers 32 which communicate with the ice-forming compartments through ports 33 at the ends of the headers, so that the refrigerant gas after acting on the water and abstracting heat therefrom can flow out of the cell, the direction of flow being indicated by the arrows in Fig. 3. These chambers 32 are connected with the pipe 6 that leads to the cooler I, as shown in Figs. 17 and 21.

The bottom of the cell 15 contains a tank E that receives the surplus water, and from this tank the water after being filtered is returned to the pre-cooling tank D. To facilitate the draining of water from the ice to the tank E the bodies of the cars F are provided with slots or apertures 34 through which the water drains. The carriages F have removable end plates 35, the lower ends of which are set in transverse grooves 36, and the end plates are kept upright by bars 37 which engage in catches 38 secured on the outer surfaces of the end plates and to the ends of the brine chamber B. These end plates insure the making of uniform shapes and lengths of ice plates, as shown in Fig. 16. When the carriages and blocks of ice thereon are to be removed from the cell, the holding bars 37 are detached, but the plates will remain adhering to the plates of ice on the carriages, and when the carriages are removed from the cell the plates can be pried or melted off. The method of operation will be readily apparent from what has already been described.

In the construction shown in Figs. 6, 7 and 8, the cell is of substantially the same design as the cell in Figs. 1 to 5 inclusive, with the exception that the perforated headers at the sides of the freezing compartments are eliminated, and the remaining similar parts of the two constructions are designated by corresponding reference characters. The air is adapted to flow longitudinally through one compartment in one direction and longitudinally through the other compartment in the opposite direction, and consequently the front end of the brine chamber B is spaced from the inner doors 17 to provide a port 41 whereby the air can flow from one compartment to the other, as indicated by the arrows, Fig. 7. The cell is provided with chambers 42 and 43 that communicate with the respective compartments through vertical slits 44, and in the chambers 42 and 43 are perforated distributing plates 45, whereby the air is more evenly distributed. These chambers 42 and 43 are connected respectively by pipes 5 and 6 with the cooler I, which reduces the air or gas to zero temperature. It will be understood that as the sheets of water flow down the opposite sides of the brine chamber B, ice will be formed by the circulation of the refrigerant gas or air through the compartments.

It may in some instances be desirable to make a block of ice of considerable thickness, and therefore there must be means provided for producing relative movement between the carriage on which the block of ice is formed and the water supply means. Two forms of cells are illustrated to accomplish these results, the form shown in Figs. 9, 10 and 11, and that shown in Figs. 12 and 13. In the first of these two forms the cell A' is provided with a rear extension chamber 46, and the track rails 47 extend into this chamber, so that on the rails two or more carriages F' can be arranged in contact, as shown in Fig. 10. These carriages F' have parallel rack bars 48 at their ends, and meshing with these rack bars are pinions 49 mounted on a shaft 50. The air distributing header G' is arranged in the cell A at a point opposite from the doors 16 and 17, and at the top of the cell and slightly in front of the header G' is the device C which supplies water in sheet form to the plate or surface 1ª and the ice formed thereon. This surface 1ª corresponds to the surface 1 of the brine chamber of Figs. 2 and 3, but the plate 1ª is provided with no means for circulating brine in contact therewith. The plate 1ª occupies an initial position directly under the device C, and as water flows down the plate the refrigerant air directed against the water will convert a part of the water into ice, the unconverted water being collected in the chamber E in the base of the cell. As the ice builds up on the plate 1ª and the front carriage F', the said carriage is moved gradually toward the front, the rate of movement being equal to the rate of ice formation. This movement of the car is effected by means which rotates the shaft 49, such means comprising a train of gears 51 receiving power from an electric or other motor 52, and connected with the shaft 49 through a ratchet wheel and pawl device 53. This device comprises a lever 54 that carries a pawl 55 engageable with the ratchet wheel 56, and a link 57 connects the lever 54 with a crank pin 58 on the last gear of the train 51, and by adjusting this crank pin toward and from the center of such gear the stroke of the rod or link 57 can be altered to vary the amount of movement the shaft 49 will have. The desired movement can be accurately adjusted by observing the rate of ice formation through a glazed peephole 58 in the wall of the cell. The carriages F' can be suitably connected, as at 58, Fig. 10, so that the rear carriage F' will drive the front carriage progressively forwardly, as shown in Fig. 10, during the last part of the formation of the block of ice. When the block of ice is finished the cell is opened so that the ice can be tempered and when the carriage and block are finally removed from the cell a plate 1ª is applied to the remaining carriage so that a block of ice can be formed thereon, but another carriage is placed in the cell and connected with the carriage already therein, so that they can move forwardly together as a train. The rear of the extension 46 may have a door 59 through which the carriages can be introduced.

In the modification shown in Figs. 12 and 13 the water supply device C moves progressively away from the surface 1 of the brine chamber B, and for this purpose the device C is mounted on the lower flight of an apron or belt 60 at the top of the cell, said belt passing around rolls 61, 62. The trough 22 and pipe 24 are secured to a frame 63 which has wheels 64 traveling on track rails 65 at the sides of the cell. A flexible hose 66 connects with the pipe 24 and with the valve 67, which in turn connects with the pre-cooling water tank, said valve 67 being controlled by a handwheel 68 in the front of the cell, as shown in Fig. 12. The belt 60 must travel to the right, Fig. 13, at the same rate that the block of ice is formed, and therefore a speed controllable driving mechanism for the roll 62 is employed. This driving mechanism comprises a motor 69 which drives a small friction wheel 70 that meshes with a friction disk 71, and between this disk and the shaft 72 of the belt roll 62 is a train of gears 73. The friction wheels 70 can be shifted from the center to the periphery of the disk 71 by a controlling lever 74. The frictional engagement of the wheel 70 with the disk 71 is effected by a rotary shaft 75 mounted in an eccentric bearing 76 and having a ball and socket connection 77 with the friction wheel 70, and by turning the crank 78 the friction wheel 70 can be thrown into and out of engagement with the disk 71. The method of forming the ice in this form of cell is the same as in the previous types, except that the water supply means C is progressively shifted as the cake of ice is built up.

In Fig. 14 is shown a cell which forms ice by spraying water into a freezing atmosphere. In the bottom of the cell A' is a brine chamber B, and disposed over the same is a rectangular mold M, the bottom of which is formed by the brine chamber and the top of the mold is open. This mold constitutes a carriage for holding and molding the block or plate of ice, and on the ends of this mold are wheels 80 which ride on track rails 81, whereby the mold can be moved into and out of the cell. Any suitable means may be employed for causing a circulation of refrigerant gas through the cell and for spraying the water into the atmosphere formed by the gas. In the present instance the cell contains a bell or rectangular box 82 open at its bottom, and in the top thereof is a horizontal partition 83 forming a chamber 84 into which the refrigerant gas is supplied through inlets 85. The header or chamber 84 has spaced openings 86 through which the air is discharged downwardly in the cell. Under the partition 83 are perforated pipes 87 which spray water into the refrigerant gas, and this water drops on the brine chamber B, and this chamber, together with the refrigerant gas, freezes the water into ice within the mold M. The water supplied to the cell is preferably distilled or spring water, unless the ice is to be used for refrigerating purposes, when raw water may be employed. At the ends of the cell passages 88 are formed through which the refrigerant gas after acting on the water passes back to the cooler. After the ice is formed in the mold M, warm brine is circulated through the chamber B, so as to melt the bottom of the mass of ice from the chamber, and after the mold with the ice therein has been removed from the cell the walls of the mold are heated so that the ice will melt loose. By referring to Fig. 15 it will be observed that the construction of the cell is somewhat like the cell shown in Fig. 2, with the exception that a perforated header $G^2$ is placed in the center of the cell and the brine chambers or sections $B^2$ are arranged at opposite sides of the header $G^2$, and by reason of this reversal of the parts separate water supplying devices $C^2$ are arranged respectively over the brine chambers $B^2$. The method of operation of both forms of these cells is the same, so that further description is unnecessary.

The carriages F may be constructed as shown in Figs. 18 to 20 inclusive, so that in each carriage a plurality of blocks of ice can be molded. The body 89 of the carriage has the usual end plate 35 set in the grooves 36 and on the top of the body 89 rests a plate 90 which has parallel upstanding ribs 91 that engage in grooves 92 in the bottoms of the partition elements 93 which are disposed vertically in spaced relation to each other, and to the end plates 35. The edges of these plates 35 and partition elements 93 at one side of the carriage will be disposed adjacent the brine chamber of the cell, so that in the compartments formed between the adjacent partition elements 93 and plates 35, blocks of ice will be formed. To readily separate the blocks of ice from the partition elements the latter are made hollow and warm water can be circulated through them, each element having inlet and outlet openings 94 and 95 for the warm water.

In Figs. 17 and 21 the cooler I is shown connected with only one cell A, but it is to be understood that one cooler may supply refrigerant gas or air to any number of cells, and in the supply pipes 5, valves $5^a$ may be employed to cut out any cell in which the ice is being tempered or removed. When a plurality of cells are supplied from a single cooler the pump H may be provided with a valve-controlled by-pass $h$, Fig. 17, so that when any of the cells are cut out, part of the air supplied to the pump may be by-passed to the inlet side thereof. This also relates to the circulating of the brine.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as are within the scope of the appended claims.

Having thus described my invention, I claim as new and desire to secure by Letters Patent:

1. The herein-described process of manufacturing ice, which consists in maintaining in a closed chamber a film flow of water on a surface or on ice formed thereon, continuously directing a gaseous refrigerant against the flowing water to convert the same into ice, drawing off the refrigerant from the chamber after the same has acted on the water, lowering the temperature of the refrigerant and again supplying the same to the closed chamber.

2. The herein-described process of manufacturing ice, which consists in maintaining in a closed chamber a film flow of water on a surface or on ice formed thereon, continuously directing a gaseous refrigerant against the flowing water to convert a part of the same into ice, drawing off the refrigerant from the chamber after the same has acted on the water, proportioning the flow of water to the temperature of the refrigerant, so that only a part of the flowing water is converted into ice, removing the excess water from the chamber, drawing off the refrigerant from the chamber, lowering the temperature of the refrigerant, and returning the refrigerant to the chamber.

3. The herein-described process of manufacturing ice, which consists in continuously producing a downflow of water in a thin vertical sheet, and subjecting the sheet of water to a freezing atmosphere of substantially uniform temperature for building up a mass of ice by the freezing of the water.

4. The herein-described process of manufacturing ice, which consists in maintaining a continuous gravity flow of water in a thin sheet, and directing continuously against the onflowing water a freezing gas to convert the water into ice.

5. The herein-described process of manufacturing ice, which consists in supplying water in the form of a sheet, and directing numerous jets of freezing gas against the sheet, whereby the mass of ice is progressively formed by the freezing of the water.

6. The herein-described process of making absolutely clear and pure ice from raw water, which consists in supplying water in the form of a sheet, subjecting the water to a refrigerant atmosphere, the temperature of which with relation to the rate of flow of the water is insufficient to freeze all the water in passing through the atmosphere, and drawing off the unfrozen water.

7. The herein-described process of manufacturing ice from raw water, which consists in maintaining a continuous refrigerant atmosphere, supplying water in sheet form continuously to the atmosphere quantitatively in excess of the freezing capacity of the latter, whereby the water is fractionally frozen into a mass of ice and drawing off the unfrozen water.

8. The herein-described process of manufacturing ice, which consists in supplying water in the form of a film on a stationary carrier and continuously blowing a freezing gas against the film, the temperature of the gas relative to the rate of flow of water being insufficient to freeze all the water influenced by the gas.

9. The herein-described process of manufacturing ice, which consists in maintaining a continuous current of gas below freezing temperature, and supplying a flow of water in film form on a stationary part and in the presence of the gas, whereby a mass of ice is produced by the freezing of a portion of the water subjected to the influence of the gas.

10. The herein-described process of manufacturing ice, which consists in maintaining within an inclosure a refrigerant atmosphere, maintaining a flow of water in film form through the atmosphere quantitatively in excess of the freezing capacity of the atmosphere, filtering the excess water, and returning the filtered water to the atmosphere.

11. The herein-described process of manufacturing ice, which consists in maintaining within an inclosure a refrigerant atmosphere, maintaining a flow of water in film form through the atmosphere quantitatively in excess of the freezing capacity of the atmosphere, filtering the excess water, pre-cooling the water, and returning the pre-cooled and filtered water to the atmosphere.

12. The herein-described process of manufacturing ice, which consists in brine-cooling a surface, causing a film of water to flow over the surface and be converted into ice, maintaining the film flow of water on the ice surface, and subjecting the film flow of water to a refrigerant atmosphere, whereby a mass of ice is built up.

13. The herein described process of manufacturing ice, which consists in brine-cooling a vertical stationary conductor plate, causing water to flow in a film down the plate and thereby be converted into ice, maintaining the film flow of water on the ice, and blowing a refrigerant gas against the film of water for building up a mass of ice.

14. The herein-described process of manufacturing ice, which consists in brine-cooling a stationary conductor plate, causing water to flow in a film down the plate and thereby be converted into ice, maintaining the film flow of water on the ice, blowing a refrigerant gas against the film of water for building up a mass of ice, and warming the said initially brine-cooled plate to loosen the mass of ice therefrom, and continuously shifting the plate from the point of origin of the blowing gas refrigerant as the ice mass progressively forms.

15. The herein-described process of manufacturing ice, which consists in maintaining a flow of brine in contact with a conductor, causing a film of water to flow along the opposite side of the conductor and be converted into ice adhering to the latter, continuing the flow of water, maintaining a refrigerant atmosphere for building up a mass of ice by the atmosphere impinging on the water, and circulating the warm brine in contact with the conductor to loosen the ice mass.

16. The herein-described process of manufacturing ice, which consists in cooling air, directing the air through a chamber, removing and re-cooling the air from the chamber, returning the re-cooled air to the chamber, and maintaining a film flow of water through the chamber quantitatively in excess of the freezing capacity of the air, whereby a mass of ice is built up in the chamber progressively, and drawing off the excess water.

17. The herein-described process of manufacturing ice, which consists in cooling air, directing the air through a chamber, removing and re-cooling the air from the chamber, returning the re-cooled air to the chamber, maintaining a film flow of water through the chamber quantitatively in excess of the freezing capacity of the air, whereby a mass of ice is built up in the chamber progressively, filtering the excess water, and returning the filtered water to the chamber.

18. The herein-described process of manufacturing ice, which consists in causing a film flow of water over a surface, subjecting the water to a refrigerant atmosphere, freezing the water thereon progressively, relatively shifting the said surface and the point of origin of the flow of water as a mass of ice is built up on the said surface, and maintaining a refrigerant atmosphere impinging on the film flow of water for converting the water into ice.

19. The herein-described process of freezing a mass of ice in a mold open only at its top and one side, which consists in directing a refrigerant gas into the open side of the mold, and maintaining a film flow of water into the mold from the top, the initial flow of the water being down the inner surface of the side of the mold, whereby a mass of ice will be formed adhering to the bottom, and side and end walls of the mold.

20. The herein-described process of freezing a mass of ice in a mold open only at its top and one side, which consists in directing a refrigerant gas into the open side of the mold, maintaining a film flow of water into the mold from the top, the initial flow of the water being down the inner surface of the side of the mold, whereby a mass of ice will be formed adhering to the bottom, and side and end wall of the mold, and melting loose the mass of ice from the bottom and walls of the mold.

21. The herein-described process of making ice in a form open only at its top and one side, which consists in directing a refrigerant gas into the open side of the mold, causing a film of water to flow into the mold from the top quantitatively in excess of the freezing capacity of the refrigerant, whereby the excess water flows out of the bottom of the mold, maintaining the flow of refrigerant and water until the mold is filled with ice, and removing the mass of ice *en bloc* from the mold.

22. An ice making plant comprising a cell in which continuously supplied water is converted into ice, said cell including a brine chamber on which ice is formed, means for discharging a refrigerant gas into the cell to freeze the water into ice, in combination with a cooler for the said gas, connection between the cooler and the second mentioned means and including a pump, separate cold and warm brine tanks connected with the brine chamber, valves for connecting either tank with the brine chamber, a water pre-cooler, a valved connection between the pre-cooler and the cell for supplying water to the latter, a tank for receiving excess water that is not converted into ice in the cell, and a filter through which the excess water flows in passing back to the pre-cooler.

In testimony whereof I have signed my name to this specification in the presence of two subscribing witnesses.

MARTIN SCHILDE.

Witnesses:
WADE NORMAN,
P. R. GALBREATH.

Copies of this patent may be obtained for five cents each, by addressing the "Commissioner of Patents, Washington, D. C."